United States Patent
Blood et al.

(10) Patent No.: US 7,270,918 B2
(45) Date of Patent: *Sep. 18, 2007

(54) PRINTING SYSTEM, PROCESS, AND PRODUCT WITH MICROPRINTING

(75) Inventors: Jeffrey C. Blood, Webster, NY (US); Leonard R. Christopher, Palmyra, NY (US); John F. Crichton, Honeoye Falls, NY (US); Thomas M. Plutchak, Hilton, NY (US); Gregory Rombola, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 326 days.

This patent is subject to a terminal disclaimer.

(21) Appl. No.: 10/991,818

(22) Filed: Nov. 18, 2004

(65) Prior Publication Data

US 2005/0142469 A1    Jun. 30, 2005

Related U.S. Application Data

(60) Provisional application No. 60/532,438, filed on Dec. 24, 2003.

(51) Int. Cl.
G03G 15/06    (2006.01)

(52) U.S. Cl. .................... 430/10; 430/120.1

(58) Field of Classification Search ............... 430/10, 430/120, 120.1
See application file for complete search history.

(56) References Cited

U.S. PATENT DOCUMENTS

| | | |
|---|---|---|
| 3,964,591 A | 6/1976 | Hill et al. |
| 3,995,147 A | 11/1976 | Sinnott et al. |
| 4,031,519 A | 6/1977 | Findley |
| 4,038,076 A | 7/1977 | Lipani |
| 4,122,520 A | 10/1978 | Adamichik et al. |
| 4,168,088 A | 9/1979 | Somlyody |
| 4,175,774 A | 11/1979 | Tonges |
| 4,176,859 A | 12/1979 | Giordano |
| 4,210,346 A | 7/1980 | Mowry, Jr. et al. |
| 4,227,720 A | 10/1980 | Mowry, Jr. et al. |
| 4,265,469 A | 5/1981 | Mowry, Jr. et al. |
| 4,310,180 A | 1/1982 | Mowry, Jr. et al. |
| 4,341,404 A | 7/1982 | Mowry, Jr. et al. |
| 4,342,096 A | 7/1982 | McDevitt |
| 4,351,547 A | 9/1982 | Brooks, II |
| 4,367,533 A | 1/1983 | Wiener |
| 4,420,175 A | 12/1983 | Mowry, Jr. |
| 4,468,141 A | 8/1984 | Rosza |
| 4,476,542 A | 10/1984 | Crean et al. |
| 4,554,637 A | 11/1985 | Kuntze |
| 4,579,370 A | 4/1986 | Corwin et al. |
| 4,582,346 A | 4/1986 | Caprio et al. |

(Continued)

FOREIGN PATENT DOCUMENTS

WO    99/62725    12/1999

(Continued)

*Primary Examiner*—John L Goodrow
(74) *Attorney, Agent, or Firm*—Donna P. Suchy

(57) ABSTRACT

The invention relates to printing of documents, for example bank checks. According to the various aspects of the invention, a printing system, process and product with microprinting are provided. Documents printed as described may include digitally variable microprint and other enhancements. The invention is particularly useful for enhanced security documents and the production thereof.

25 Claims, 10 Drawing Sheets

U.S. PATENT DOCUMENTS

| | | |
|---|---|---|
| 4,604,712 A | 8/1986 | Orrhammar |
| 4,615,012 A | 9/1986 | Arazu et al. |
| 4,627,002 A | 12/1986 | Blum et al. |
| 4,703,323 A | 10/1987 | Troupes et al. |
| 4,715,006 A | 12/1987 | Nagata |
| 4,745,560 A | 5/1988 | Decker et al. |
| 4,891,666 A | 1/1990 | Gordon |
| 5,018,767 A | 5/1991 | Wicker |
| 5,171,040 A | 12/1992 | Orndorff |
| 5,193,853 A | 3/1993 | Wicker |
| 5,197,765 A | 3/1993 | Mowry, Jr. et al. |
| 5,271,645 A | 12/1993 | Wicker |
| 5,284,364 A | 2/1994 | Jain |
| 5,297,815 A | 3/1994 | Anderson et al. |
| 5,371,798 A | 12/1994 | McWhortor |
| 5,385,803 A | 1/1995 | Duff et al. |
| 5,438,928 A | 8/1995 | Chatwin et al. |
| 5,479,507 A | 12/1995 | Anderson |
| 5,554,480 A | 9/1996 | Patel et al. |
| 5,581,292 A * | 12/1996 | Cianciosi et al. ........... 347/131 |
| 5,636,874 A | 6/1997 | Singer |
| 5,661,507 A * | 8/1997 | Sperry ........................... 347/9 |
| 5,735,547 A | 4/1998 | Morelle et al. |
| 5,769,458 A | 6/1998 | Carides et al. |
| 5,824,447 A | 10/1998 | Tavernier et al. |
| 5,951,055 A | 9/1999 | Mowry, Jr. |
| 6,066,594 A | 5/2000 | Gunn et al. |
| 6,188,468 B1 | 2/2001 | Miyajima |
| 6,209,923 B1 | 4/2001 | Thaxton et al. |
| 6,381,035 B1 * | 4/2002 | Zhang et al. ................ 358/1.9 |
| 6,489,984 B1 | 12/2002 | Johnson |
| 6,664,017 B1 | 12/2003 | Patel et al. |
| 6,673,500 B1 | 1/2004 | Patel et al. |

FOREIGN PATENT DOCUMENTS

| | | |
|---|---|---|
| WO | WO02/50628 | 6/2002 |

* cited by examiner

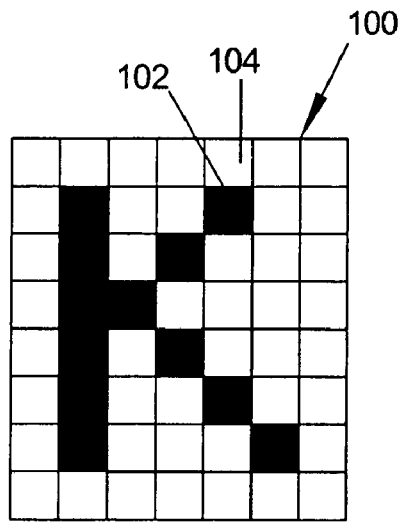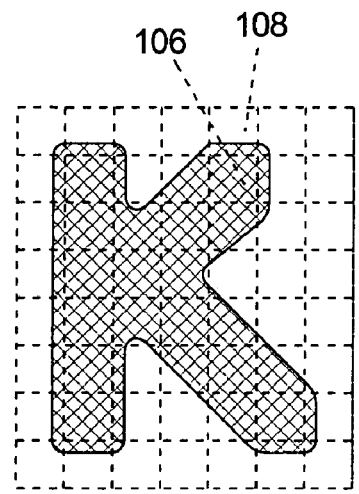
FIG. 9          FIG. 10
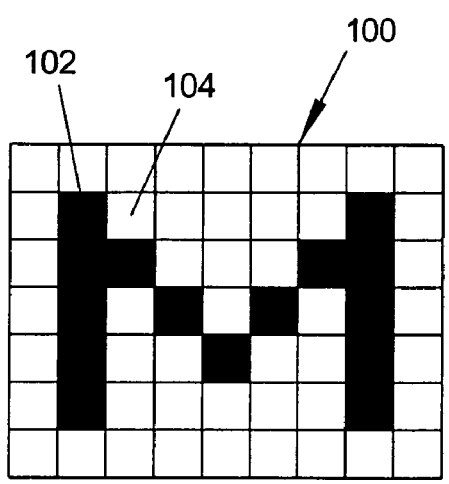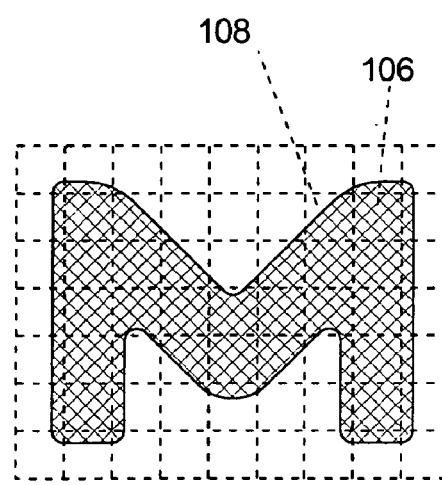
FIG. 11         FIG. 12

5 pixel Font (~0.8 point)

6 pixel Font (~0.9 point)

7 pixel Font (~1.0 point)

FIG. 17

PRINTING SYSTEM, PROCESS, AND PRODUCT WITH MICROPRINTING

CROSS REFERENCE TO RELATED APPLICATIONS

This application claims the benefit of U.S. Provisional Patent Application No. 60/532,438 filed Dec. 24, 2003.

FIELD OF THE INVENTION

The invention relates to printing of documents, for example bank checks, with security features.

BACKGROUND OF THE INVENTION

Fraud associated with certain documents, for example bank checks, is an old and well known problem. Problems include alteration, counterfeiting, and copying (which may be included as a subset of counterfeiting). Various measures and associated technologies have been developed to protect against fraud. Examples include intricate designs, microprinting, colorshifting inks, fluorescent inks, watermarks, fluorescent threads, colored threads, security strips, holograms, foil printing, and others.

Microtext is a security feature which is used frequently in the form of a signature line or box around the face of a check. For example, a sub-single point text may appear to the unenhanced eye as a simple line, but readable with low power magnification. Because of the small size of the characters printed, this has been limited to lithographically printed text. Lithographically printed microtext protects against counterfeiting fraud in that the fraudster may not be aware of the presence of the microtext or may not have sufficient technology to produce the very small text. Litho text is inherently static because of the production process. Microtext can protect against copying, at least to some extent, if the original text is so small that a copy is difficult if not impossible to read. However, legibility of microprint made with known electrographic printing systems has not been satisfactory.

Furthermore, microtext as it is currently practiced offers little, if any, protection against alteration, for example of the payee and/or the amount of a check. First, the information is static, subject to other static elements in the lithographic printing process. Second, as a lithographic element, the difficulty of removal for the purposes of changing the document is at least different from that of a variable toner image and may be much more durable, permitting toner to be removed from over top of the microtext without disturbing it.

BRIEF DESCRIPTION OF THE DRAWINGS

FIG. 9 presents a pixel array for the letter K in accordance with the invention.

FIG. 10 presents the pixel array of FIG. 9 after marking on a receiver in accordance with the invention.

FIG. 11 presents a pixel array for the letter M in accordance with the invention.

FIG. 12 presents the pixel array of FIG. 11 after marking on a receiver in accordance with the invention.

FIG. 17 presents microprint rendered according to Example 1.

DETAILED DESCRIPTION OF THE INVENTION

Figure 1:
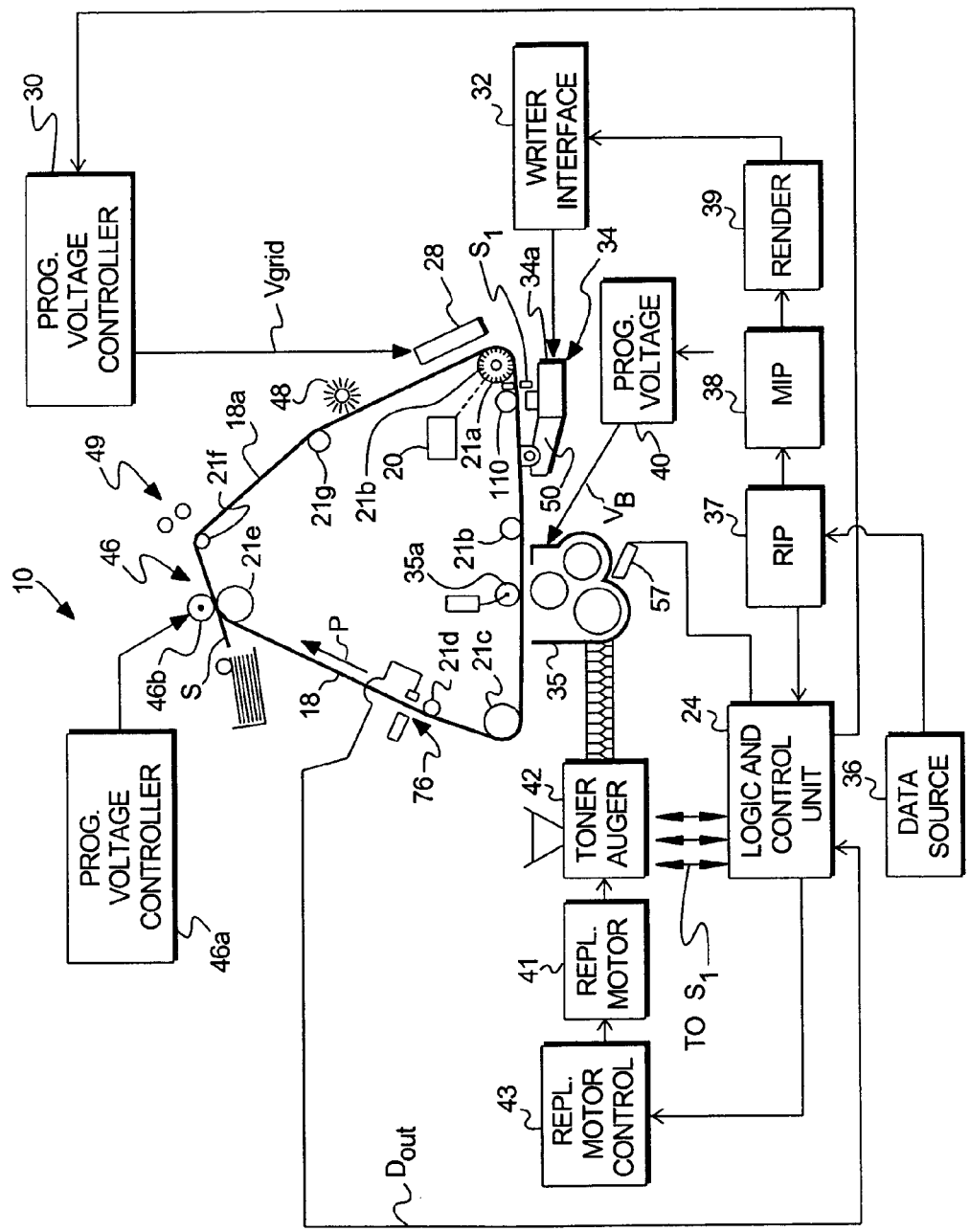
FIGS. 1 and 2 present schematic diagrams of an electrographic marking or reproduction system in accordance with the present invention.
Figure 2:
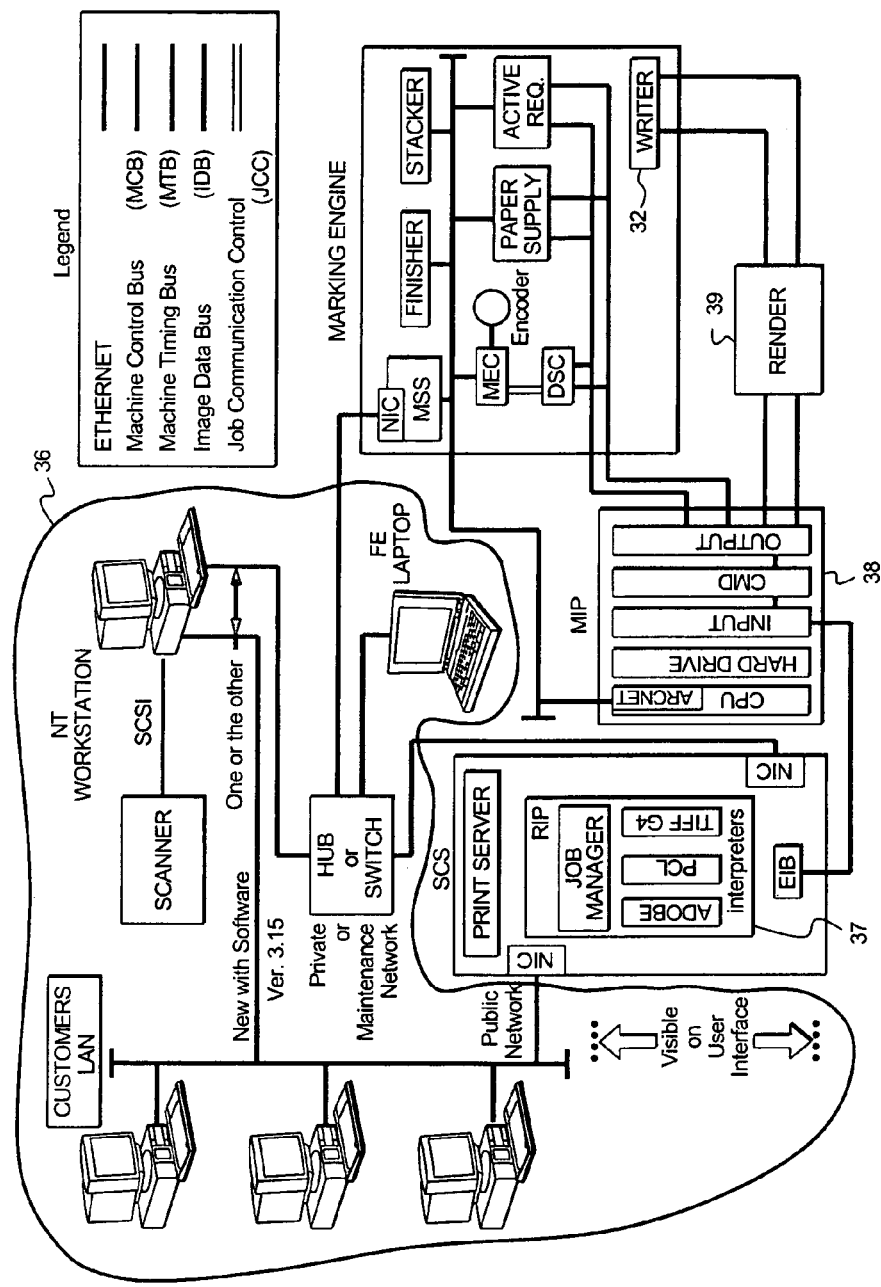

Referring to FIGS. 1 and 2, a printer machine 10 includes a moving electrographic imaging member such as a photoconductive belt 18 which is entrained about a plurality of rollers or other supports 21a through 21g, one or more of which is driven by a motor to advance the belt. By way of example, roller 21a is illustrated as being driven by motor 20. Motor 20 preferably advances the belt at a high speed, such as 20 inches per second or higher, in the direction indicated by arrow P, past a series of workstations of the printer machine 10. Alternatively, belt 18 may be wrapped and secured about only a single drum, or may be a drum.

Printer machine 10 includes a controller or logic and control unit (LCU) 24, preferably a digital computer or microprocessor operating according to a stored program for sequentially actuating the workstations within printer machine 10, effecting overall control of printer machine 10 and its various subsystems. LCU 24 also is programmed to provide closed-loop control of printer machine 10 in response to signals from various sensors and encoders. Aspects of process control are described in U.S. Pat. No. 6,121,986 incorporated herein by this reference.

A primary charging station 28 in printer machine 10 sensitizes belt 18 by applying a uniform electrostatic corona charge, from high-voltage charging wires at a predetermined primary voltage, to a surface 18a of belt 18. The output of charging station 28 is regulated by a programmable voltage controller 30, which is in turn controlled by LCU 24 to adjust this primary voltage, for example by controlling the electrical potential of a grid and thus controlling movement of the corona charge. Other forms of chargers, including brush or roller chargers, may also be used.

An exposure station 34 in printer machine 10 projects light from a writer 34a to belt 18. This light selectively dissipates the electrostatic charge on photoconductive belt 18 to form a latent electrostatic image of the document to be copied or printed. Writer 34a is preferably constructed as an array of light emitting diodes (LEDs), or alternatively as another light source such as a laser or spatial light modulator. Writer 34a exposes individual picture elements (pixels) of belt 18 with light at a regulated intensity and exposure, in the manner described below. The exposing light discharges selected pixel locations of the photoconductor, so that the pattern of localized voltages across the photoconductor corresponds to the image to be printed. An image is a pattern of physical light which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

Image data to be printed is provided by an image data source 36, which is a device that can provide digital data defining a version of the image. Such types of devices are numerous and include computer or microcontroller, computer workstation, scanner, digital camera, etc. These data represent the location and intensity of each pixel that is exposed by the printer. Signals from data source 36, in combination with control signals from LCU 24 are provided to a raster image processor (RIP) 37. The Digital images (including styled text) are converted by the RIP 37 from their form in a page description language (PDL) to a sequence of serial instructions for the electrographic printer in a process commonly known as "ripping" and which provides a ripped image to a image storage and retrieval system known as a Marking Image Processor (MIP) 38.

In general, the major roles of the RIP 37 are to: receive job information from the server; parse the header from the print job and determine the printing and finishing requirements of the job; analyze the PDL (Page Description Language) to reflect any job or page requirements that were not stated in the header; resolve any conflicts between the requirements of the job and the Marking Engine configuration (i.e., RIP time mismatch resolution); keep accounting record and error logs and provide this information to any subsystem, upon request; communicate image transfer requirements to the Marking Engine; translate the data from PDL (Page Description Language) to Raster for printing; and support diagnostics communication between User Applications The RIP accepts a print job in the form of a Page Description Language (PDL) such as PostScript, PDF or PCL and converts it into Raster, a form that the marking engine can accept. The PDL file received at the RIP describes the layout of the document as it was created on the host computer used by the customer. This conversion process is called rasterization. The RIP makes the decision on how to process the document based on what PDL the document is described in. It reaches this decision by looking at the first 2K of the document. A job manager sends the job information to a MSS (Marking Subsystem Services) via Ethernet and the rest of the document further into the RIP to get rasterized. For clarification, the document header contains printer-specific information such as whether to staple or duplex the job. Once the document has been converted to raster by one of the interpreters, the Raster data goes to the MIP 38 via RTS (Raster Transfer Services); this transfers the data over a IDB (Image Data Bus).

The MIP functionally replaces recirculating feeders on optical copiers. This means that images are not mechanically rescanned within jobs that require rescanning, but rather, images are electronically retrieved from the MIP to replace the rescan process. The MIP accepts digital image input and stores it for a limited time so it can be retrieved and printed to complete the job as needed. The MIP consists of memory for storing digital image input received from the RIP. Once the images are in MIP memory, they can be repeatedly read from memory and output to the Render Circuit. The amount of memory required to store a given number of images can be reduced by compressing the images; therefore, the images are compressed prior to MIP memory storage, then decompressed while being read from MIP memory.

The output of the MIP is provided to an image render circuit 39, which alters the image and provides the altered image to the writer interface 32 (otherwise known as a write head, print head, etc.) which applies exposure parameters to the exposure medium, such as a photoconductor 18.

After exposure, the portion of exposure medium belt 18 bearing the latent charge images travels to a development station 35. Development station 35 includes a magnetic brush in juxtaposition to the belt 18. Magnetic brush development stations are well known in the art, and are preferred in many applications; alternatively, other known types of development stations or devices may be used. Plural development stations 35 may be provided for developing images in plural colors, or from toners of different physical characteristics. Full process color electrographic printing is accomplished by utilizing this process for each of four toner colors (e.g., black, cyan, magenta, yellow).

Upon the imaged portion of belt 18 reaching development station 35, LCU 24 selectively activates development station 35 to apply toner to belt 18 by moving backup roller or bar 35a against belt 18, into engagement with or close proximity to the magnetic brush. Alternatively, the magnetic brush may be moved toward belt 18 to selectively engage belt 18. In either case, charged toner particles on the magnetic brush are selectively attracted to the latent image patterns present on belt 18, developing those image patterns. As the exposed photoconductor passes the developing station, toner is attracted to pixel locations of the photoconductor and as a result, a pattern of toner corresponding to the image to be printed appears on the photoconductor. As known in the art, conductor portions of development station 35, such as conductive applicator cylinders, are biased to act as electrodes. The electrodes are connected to a variable supply voltage, which is regulated by programmable controller 40 in response to LCU 24, by way of which the development process is controlled.

Development station 35 may contain a two component developer mix which comprises a dry mixture of toner and carrier particles. Typically the carrier preferably comprises high coercivity (hard magnetic) ferrite particles. As an example, the carrier particles have a volume-weighted diameter of approximately 30μ. The dry toner particles are substantially smaller, on the order of 6μ to 15μ in volume-weighted diameter. Development station 35 may include an applicator having a rotatable magnetic core within a shell, which also may be rotatably driven by a motor or other suitable driving means. Relative rotation of the core and shell moves the developer through a development zone in the presence of an electrical field. In the course of development, the toner selectively electrostatically adheres to photoconductive belt 18 to develop the electrostatic images thereon and the carrier material remains at development station 35. As toner is depleted from the development station due to the development of the electrostatic image, additional toner is periodically introduced by toner auger 42 into development station 35 to be mixed with the carrier particles to maintain a uniform amount of development mixture. This development mixture is controlled in accordance with various development control processes. Single component developer stations, as well as conventional liquid toner development stations, may also be used.

A transfer station 46 in printing machine 10 moves a receiver sheet S into engagement with photoconductive belt 18, in registration with a developed image to transfer the developed image to receiver sheet S. Receiver sheets S may be plain or coated paper, plastic, or another medium capable of being handled by printer machine 10. Typically, transfer station 46 includes a charging device for electrostatically biasing movement of the toner particles from belt 18 to receiver sheet S. In this example, the biasing device is roller 46b, which engages the back of sheet S and which is connected to programmable voltage controller 46a that operates in a constant current mode during transfer. Alternatively, an intermediate member may have the image transferred to it and the image may then be transferred to receiver sheet S. After transfer of the toner image to receiver sheet S, sheet S is detacked from belt 18 and transported to fuser station 49 where the image is fixed onto sheet S, typically by the application of heat and pressure. Alternatively, the image may be fixed to sheet S at the time of transfer.

A cleaning station 48, such as a brush, blade, or web is also located behind transfer station 46, and removes residual toner from belt 18. A pre-clean charger (not shown) may be located before or at cleaning station 48 to assist in this cleaning. After cleaning, this portion of belt 18 is then ready for recharging and re-exposure. Of course, other portions of belt 18 are simultaneously located at the various workstations of printing machine 10, so that the printing process is carried out in a substantially continuous manner.

LCU 24 provides overall control of the apparatus and its various subsystems as is well known. LCU 24 will typically include temporary data storage memory, a central processing unit, timing and cycle control unit, and stored program control. Data input and output is performed sequentially through or under program control. Input data can be applied through input signal buffers to an input data processor, or through an interrupt signal processor, and include input signals from various switches, sensors, and analog-to-digital converters internal to printing machine 10, or received from sources external to printing machine 10, such from as a human user or a network control. The output data and control signals from LCU 24 are applied directly or through storage latches to suitable output drivers and in turn to the appropriate subsystems within printing machine 10.

Process control strategies generally utilize various sensors to provide real-time closed-loop control of the electrostatographic process so that printing machine 10 generates "constant" image quality output, from the user's perspective. Real-time process control is necessary in electrographic printing, to account for changes in the environmental ambient of the photographic printer, and for changes in the operating conditions of the printer that occur over time during operation (rest/run effects). An important environmental condition parameter requiring process control is relative humidity, because changes in relative humidity affect the charge-to-mass ratio Q/m of toner particles. The ratio Q/m directly determines the density of toner that adheres to the photoconductor during development, and thus directly affects the density of the resulting image. System changes that can occur over time include changes due to aging of the printhead (exposure station), changes in the concentration of magnetic carrier particles in the toner as the toner is depleted through use, changes in the mechanical position of primary charger elements, aging of the photoconductor, variability in the manufacture of electrical components and of the photoconductor, change in conditions as the printer warms up after power-on, triboelectric charging of the toner, and other changes in electrographic process conditions. Because of these effects and the high resolution of modem electrographic printing, the process control techniques have become quite complex.

Process control sensor may be a densitometer 76, which monitors test patches that are exposed and developed in non-image areas of photoconductive belt 18 under the control of LCU 24. Densitometer 76 may include a infrared or visible light LED, which either shines through the belt or is reflected by the belt onto a photodiode in densitometer 76. These toned test patches are exposed to varying toner density levels, including full density and various intermediate densities, so that the actual density of toner in the patch can be compared with the desired density of toner as indicated by the various control voltages and signals. These densitometer measurements are used to control primary charging voltage $V_O$, maximum exposure light intensity $E_O$, and development station electrode bias $V_B$. In addition, the process control of a toner replenishment control signal value or a toner concentration setpoint value to maintain the charge-to-mass ratio Q/m at a level that avoids dusting or hollow character formation due to low toner charge, and also avoids breakdown and transfer mottle due to high toner charge for improved accuracy in the process control of printing machine 10. The toned test patches are formed in the interframe area of belt 18 so that the process control can be carried out in real time without reducing the printed output throughput. Another sensor useful for monitoring process parameters in printer machine 10 is electrometer probe 50, mounted downstream of the corona charging station 28 relative to direction P of the movement of belt 18. An example of an electrometer is described in U.S. Pat. No. 5,956,544 incorporated herein by this reference.

Other approaches to electrographic printing process control may be utilized, such as those described in International Publication Number WO 02/10860 A1, and International Publication Number WO 02/14957 A1, both commonly assigned herewith and incorporated herein by this reference.

Raster image processing begins with a page description generated by the computer application used to produce the desired image. The Raster Image Processor interprets this page description into a display list of objects. This display list contains a descriptor for each text and non-text object to be printed; in the case of text, the descriptor specifies each text character, its font, and its location on the page. For example, the contents of a word processing document with styled text is translated by the RIP into serial printer instructions that include, for the example of a binary black printer, a bit for each pixel location indicating whether that pixel is to be black or white. Binary print means an image is converted to a digital array of pixels, each pixel having a value assigned to it, and wherein the digital value of every pixel is represented by only two possible numbers, either a one or a zero. The digital image in such a case is known as a binary image. Multi-bit images, alternatively, are represented by a digital array of pixels, wherein the pixels have assigned values of more than two number possibilities. The RIP renders the display list into a "contone" (continuous tone) byte map for the page to be printed. This contone byte map represents each pixel location on the page to be printed by a density level (typically eight bits, or one byte, for a byte map rendering) for each color to be printed. Black text is generally represented by a full density value (255, for an eight bit rendering) for each pixel within the character. The byte map typically contains more information than can be used by the printer. Finally, the RIP rasterizes the byte map into a bit map for use by the printer. Half-tone densities are formed by the application of a halftone "screen" to the byte map, especially in the case of image objects to be printed. Pre-press adjustments can include the selection of the particular halftone screens to be applied, for example to adjust the contrast of the resulting image.

Electrographic printers with gray scale printheads are also known, as described in International Publication Number WO 01/89194 A2, incorporated herein by this reference. As described in this publication, the rendering algorithm groups adjacent pixels into sets of adjacent cells, each cell corresponding to a halftone dot of the image to be printed. The gray tones are printed by increasing the level of exposure of each pixel in the cell, by increasing the duration by way of which a corresponding LED in the printhead is kept on, and by "growing" the exposure into adjacent pixels within the cell.

Ripping is printer-specific, in that the writing characteristics of the printer to be used are taken into account in producing the printer bit map. For example, the resolution of the printer both in pixel size (dpi) and contrast resolution (bit depth at the contone byte map) will determine the contone byte map. As noted above, the contrast performance of the printer can be used in pre-press to select the appropriate halftone screen. RIP rendering therefore incorporates the attributes of the printer itself with the image data to be printed.

The printer specificity in the RIP output may cause problems if the RIP output is forwarded to a different electrographic printer. One such problem is that the printed image will turn out to be either darker or lighter than that which would be printed on the printer for which the original RIP was performed. In some cases the original image data is not available for re-processing by another RIP in which tonal adjustments for the new printer may be made.

Processes for developing electrostatic images using dry toner are well known in the art. The term "electrographic printer," is intended to encompass electrophotographic printers and copiers that employ a photoconductor element, as well as ionographic printers and copiers that do not rely upon a photoconductor. Although described in relation to an electrographic printer, any printer suitable for digitally variable microprinting or printing pantographs may be implemented in the practice of the invention.

Electrographic printers typically employ a developer having two or more components, consisting of resinous, pigmented toner particles, magnetic carrier particles and other components. The developer is moved into proximity with an electrostatic image carried on an electrographic imaging member, whereupon the toner component of the developer is transferred to the imaging member, prior to being transferred to a sheet of paper to create the final image. Developer is moved into proximity with the imaging member by an electrically-biased, conductive toning shell, often a roller that may be rotated co-currently with the imaging member, such that the opposing surfaces of the imaging member and toning shell travel in the same direction. Located adjacent the toning shell is a multipole magnetic core, having a plurality of magnets, that may be fixed relative to the toning shell or that may rotate, usually in the opposite direction of the toning shell. The developer is deposited on the toning shell and the toning shell rotates the developer into proximity with the imaging member, at a location where the imaging member and the toning shell are in closest proximity, referred to as the "toning nip."

Figure 3:
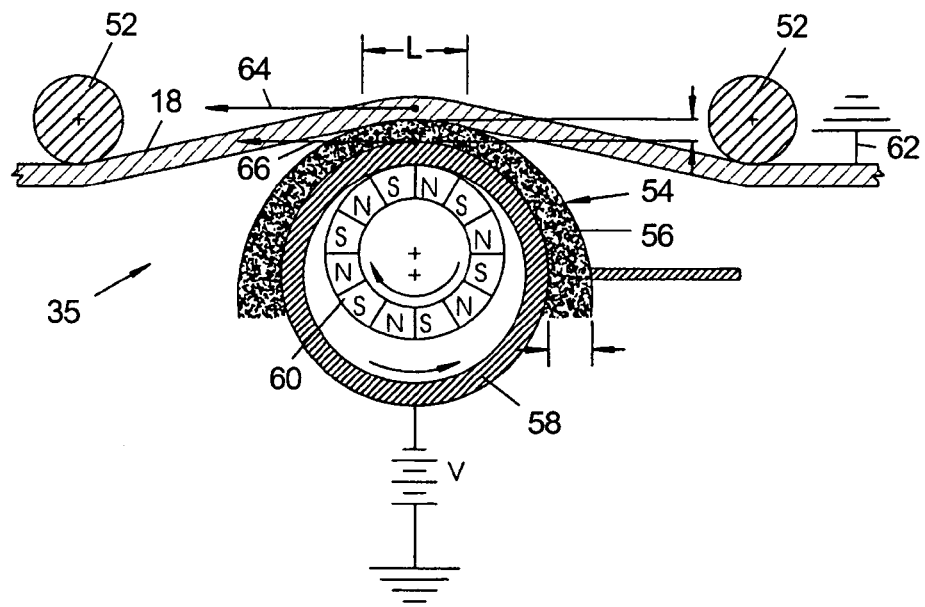
FIG. 3 presents an example of a development station implemented in the electrographic marking or reproduction system of FIGS. 1 and 2.

Referring now to FIG. 3, one embodiment of the development station 35 is presented. The development station 35 may comprise a magnetic brush 54 comprising a rotating shell 58, a mixture 56 of hard magnetic carriers and toner (also referred to herein as "developer"), and a rotating plurality of magnets 60 inside the rotating shell 58. The backup structure 35a of FIG. 1 is configured as a pair of backer bars 52. The magnetic brush 54 operates according to the principles described in U.S. Pat. Nos. 4,473,029 and 4,546,060, the contents of which are fully incorporated by reference as if set forth herein. The two-component dry developer composition of U.S. Pat. No. 4,546,060 comprises charged toner particles and oppositely charged, magnetic carrier particles, which (a) comprise a magnetic material exhibiting "hard" magnetic properties, as characterized by a coercivity of at least 300 gauss and (b) exhibit an induced magnetic moment of at least 20 EMU/gm when in an applied field of 1000 gauss, is disclosed. As described in the '060 patent, the developer is employed in combination with a magnetic applicator comprising a rotatable magnetic core and an outer, nonmagnetizable shell to develop electrostatic images. When hard magnetic carrier particles are employed, exposure to a succession of magnetic fields emanating from the rotating core applicator causes the particles to flip or turn to move into magnetic alignment in each new field. Each flip, moreover, as a consequence of both the magnetic moment of the particles and the coercivity of the magnetic material, is accompanied by a rapid circumferential step by each particle in a direction opposite the movement of the rotating core. The observed result is that the developers of the '060 flow smoothly and at a rapid rate around the shell while the core rotates in the opposite direction, thus rapidly delivering fresh toner to the photoconductor and facilitating high-volume copy and printer applications.

The electrostatic imaging member 18 of FIGS. 1 and 3 is configured as a sheet-like film. However, it may be configured in other ways, such as a drum, depending upon the particular application. A film electrostatic imaging member 12 is relatively resilient, typically under tension, and the pair of backer bars 52 may be provided that hold the imaging member in a desired position relative to the shell 18.

According to a further aspect of the invention, the process comprises moving electrostatic imaging member 18 at a member velocity 64, and rotating the shell 58 with a shell surface velocity 66 adjacent the electrostatic imaging member 18 and co-directional with the member velocity 64. The shell 58 and magnetic poles 60 bring the mixture 56 of hard magnetic carriers and toner into contact with the electrostatic imaging member 18. The mixture 56 contacts that electrostatic imaging member 18 over a length indicated as L. The electrostatic imaging member is electrically grounded 62 and defines a ground plane. The surface of the electrostatic imaging member facing the shell 58 is a photoconductor that can be treated at this point in the process as an electrical insulator, the shell opposite that is grounded is an electrical conductor. Biasing the shell relative to the ground 62 with a voltage V creates an electric field that attracts toner particles to the electrostatic image with a uniform toner density, the electric field being a maximum where the shell 58 is adjacent to the electrostatic imaging member 18. Toning setpoints may be optimized, as disclosed in U.S. Pat. No. 6,526,247, the contents of which are hereby incorporated by reference as if fully set forth herein. The magnetic core may have 14 magnets, a maximum magnetic field strength of 950 gauss and a minimum magnetic field strength of 850 gauss. At 110 pages per minute the ribbon blender may rotate 355 RPM, the toning shell may rotate at 129.1 RPM, and the magnetic core may rotate at 1141 RPM. At 150 pages per minute the ribbon blender may rotate 484

RPM, the toning shell may rotate at 176 RPM, and the magnetic core may rotate at 1555.9 RPM.

The mass velocity (also referred to as bulk velocity) may have flow properties as described in the United States Patent Application 2002/0168200 A1, the contents of which are incorporated by reference as if fully set forth herein. In one embodiment, the developer is caused to move through the image development area in the direction of imaging member travel at a developer mass velocity greater than about 37% of the imaging member velocity. In another embodiment, the developer mass velocity is greater than about 50% of the imaging member velocity. In a further embodiment, the developer mass velocity is greater than about 75% of the imaging member velocity. In a yet further embodiment, the developer mass velocity is greater than about 90% of the imaging member velocity. In a still further embodiment, the developer mass velocity is between 40% and 130% of the imaging member velocity, and preferably between 90% and 110% of the imaging member velocity. In another embodiment, the developer mass velocity is substantially equal to the imaging member velocity.

The toner particles may comprise MICR (Magnetic Ink Character Recognition) toner particles. A suitable MICR toner is described in U.S. Pat. No. 6,610,451 entitled "DEVELOPMENT SYSTEMS FOR MAGNETIC TONERS HAVING REDUCED MAGNETIC LOADINGS", with about 23% iron oxide and 8% olefinic wax by weight, and a silica surface treatment. The U.S. Pat. No. 6,610,451 patent is incorporated by reference as if fully set forth herein. A polymethylmethacrylate surface treatment may also be implemented, for example catalogue number MP1201 available from Soken Chemical & Engineering Co., Ltd., Tokyo, Japan, and distributed by Esprix Technologies of Sarasota, Fla. The carrier particles may be SrFe12O19 coated with polymethylmethacrylate. Volume mean diameter of 20.5 microns (sigma=0.7 microns for ten production runs of a carrier material), measured using an Aerosizer particle sizing apparatus (TSI Incorporated of Shoreview, Minn.). A suitable carrier has a coercivity of 2050 Gauss, a saturation magnetization of 55 emu/g, and a remnance of 32 emu/g, measured using an 8 kG loop on a Lake Shore Vibrating Sample Magnetometer (Lake Shore Cryotronics, Inc., of Westerville, Ohio). The invention is not limited to MICR toner.

Other toners are also suitable in the practice of the invention. Polyester based toners and styrene acrylate polymer based toners, for example, without limitation, as described in published United States Patent Applications 2003/0073017, 2003/0013032, 2003/0027068, 2003/0049552, and unpublished U.S. patent application Ser. No. 10/460,528—filed Jun. 12, 2003—"Electrophotographic Toner and Developer with Humidity Stability, and Ser. No. 10/460,514—filed Jun. 12, 2003—"Electrophotographic Toner with Uniformly Dispersed Wax" may be implemented.

It should be understood that colored toners, created from any polymer suitable for use in printers as described above, commonly called "accent colors", or even those suitable for "process colors", may be utilized in the practice of this invention as well. The term "accent colors" is used here to indicate colored toners (other than black) generally used by themselves to print their own color, while "process colors" refers to colored toners (other than black) generally used in combination to create the visual impression of a color frequently different from any of the original colors. Marking may comprise printing with one or more process color toners. Process colored toners can obviously be used as a single toner in the same manner as accent colored toners. Furthermore, this invention contemplates the use of clear or colored toners containing dyes sensitive to ultraviolet or infrared radiation and producing fluorescence when exposed to those radiations. Examples are disclosed in U.S. Pat. Nos. 5,385,803, 5,554,480, 5,824,447, 6,664,017 and 6,673,500.

Figures 7, 8:
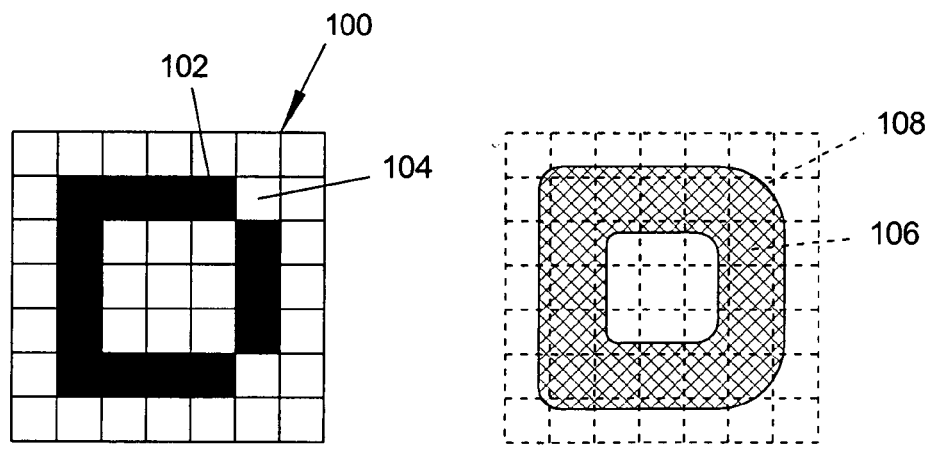
FIG. 7 presents a pixel array for the letter D in accordance with the invention.
FIG. 8 presents the pixel array of FIG. 7 after marking on a receiver in accordance with the invention.
Figure 4:
FIG. 4 presents a font suitable for microprinting in accordance with the invention.
Figure 5:
FIG. 5 presents a font suitable for microprinting in accordance with the invention.
Figure 6:
FIG. 6 presents a font suitable for microprinting in accordance with the invention.

Referring now to FIGS. 5, 6, and 7 three examples of fonts suitable for microtext printing are presented. The fonts are comprised of an array or pattern of pixels defined electronically in memory. Each pixel is a representation of approximately one six hundredth of an inch when printed (600 dpi). Of course, other printing resolutions are contemplated in the practice of the invention such as 800 or 1200 dpi, for example. In FIGS. 4, 5, and 6 certain pixels are identified for marking on the print medium and other pixels are not identified for marking, so that when the fonts are printed, marked pixels bleed over or at least partially overlie certain unmarked pixels adjacent to marking pixels such that legible two point or less characters are rendered. (one point being nominally 1/72 of an inch, as is well known in the printing industry). According to a further aspect of the invention, one point or less characters may be rendered. "Legible" means that the characters are human readable, although generally and preferably with magnification, for example a low-power magnification. "Characters" includes alphanumeric characters, for example from the English, German, Spanish, Dutch, French, etc., alphabets and numbering systems. "Characters" also includes oriental human readable characters, for example Japanese and Chinese language characters.

The characters may be arranged in strings that convey human readable and understandable information, for example information about the document, the payor, the payee, the amount of a check, etc., without limitation, as may be desirable for a particular implementation.

Still referring to FIGS. 4, 5, and 6 an array 100, 200, or 300 is defined comprising pixels 102, 202, or 302 identified for marking and other pixels 104, 204, 304 adjacent to the pixels 102, 202, 302, respectively, which are not identified for marking. A two point or less legible character may be rendered on a receiver by at least partially marking areas on the receiver corresponding to said pixels 102, 202, 302 and other areas on said receiver corresponding to the other pixels 104, 204, 304. According to a further aspect of the invention, one point or less characters may be rendered. The receiver may be a paper sheet, plastic sheet, the electrostatic imaging member 18, etc. According to the various aspects of the invention, legible alphanumeric characters having a height less than or equal to 0.028 inches (2/72 of an inch) and less than or equal to 0.014 inches (1/72 of an inch) may be printed. At 600 dpi, the font of FIG. 4 is nominally 0.008 inches high, and the marked font of FIG. 6 is nominally 0.012 inches high. With bleeding or over-marking of adjacent pixels, the marked font of FIG. 4 may be approximately 0.011 inches high, and the marked font of FIG. 6 may be approximately 0.014 inches high. This depends upon exposure of the electrostatic imaging member 18, at least to some extent, as will be discussed. The height of the marked font may also be less than the nominal height.

Referring now to FIG. 7, an array 100 for the letter D is presented comprising pixels 102 and other pixels 104. FIG. 8 presents a graphical representation of the letter D after rendering on a receiver. Areas 106 correspond to the pixels 102, and other areas 108 correspond to the pixels 104. The areas 106 corresponding to the pixels 102 are preferably completely marked, as shown in FIG. 8.

The characters of FIGS. 4, 5, and 6 are composed of horizontal single pixel lines, vertical single pixel lines, single pixel diagonal lines, and isolated pixels (see the letter K in FIG. 4, for example). The characters may be composed in this manner anticipating partial marking of the other pixels 104 adjacent to the pixels 102 so that a legible character results after marking. Vertical and horizontal lines of pixels 102 may intervene with a mutually adjacent other pixel 104, as is demonstrated with the letter D in FIG. 7. The top and bottom horizontal lines intervene with the top and bottom, respectively, of a vertical line on the right side of the character. An intervening other pixel 104 not indicated for marking is mutually adjacent the top horizontal line and the right vertical line, and another is mutually adjacent the bottom horizontal line and the right vertical line. As demonstrated in FIG. 8, a legible character D is rendered. Examples for the characters K and M are presented in FIGS. 9-12.

Figure 13:
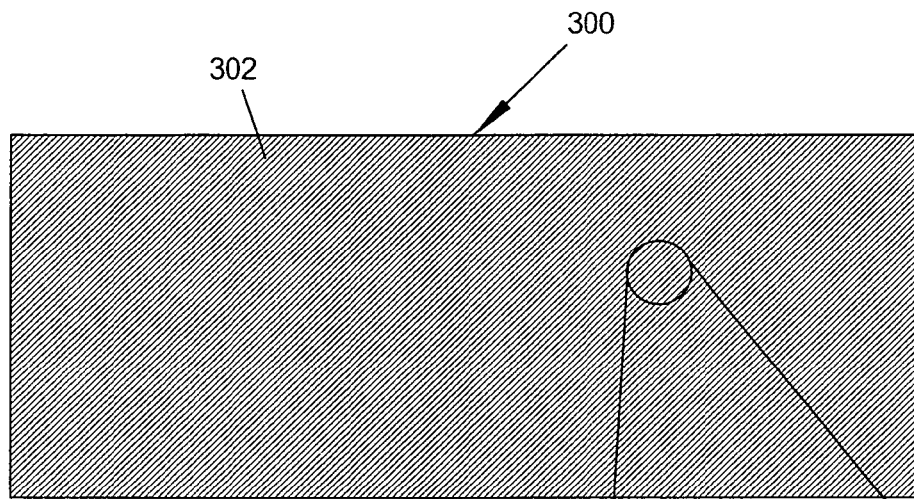
FIG. 13 presents a document comprising a pantograph in accordance with the invention.
Figure 13:
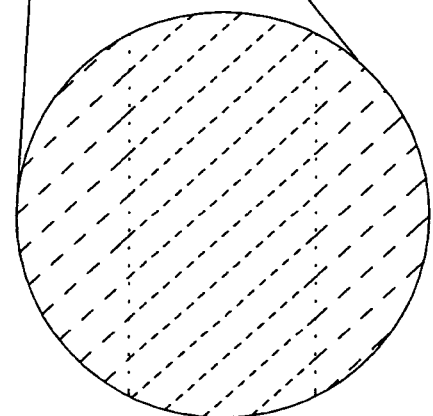

Referring now to FIG. 13, a document 300 comprising a pantograph 302 is presented according to an aspect of the invention. A copy 304 of the document 300 reveals a word such as "VOID". The purpose is to discourage copying of the document 300. Various patterns and methods of creating pantographs are known in the art, and it is not intended to limit the invention to any particular type of pantograph. As is shown in the enlarged portion of FIG. 13, pantograph 302 is composed of fine dashed or dotted lines. The frequency and size of the dashes or dots is varied within the text zones relative to the background in a manner that presents a uniform tone to the eye (a constant toning density). Upon copying, the greater frequency smaller structure within the text zones coalesces into lines, relative to the background, thus bringing the text to foreground and rendering it easily visible.

Figure 14:
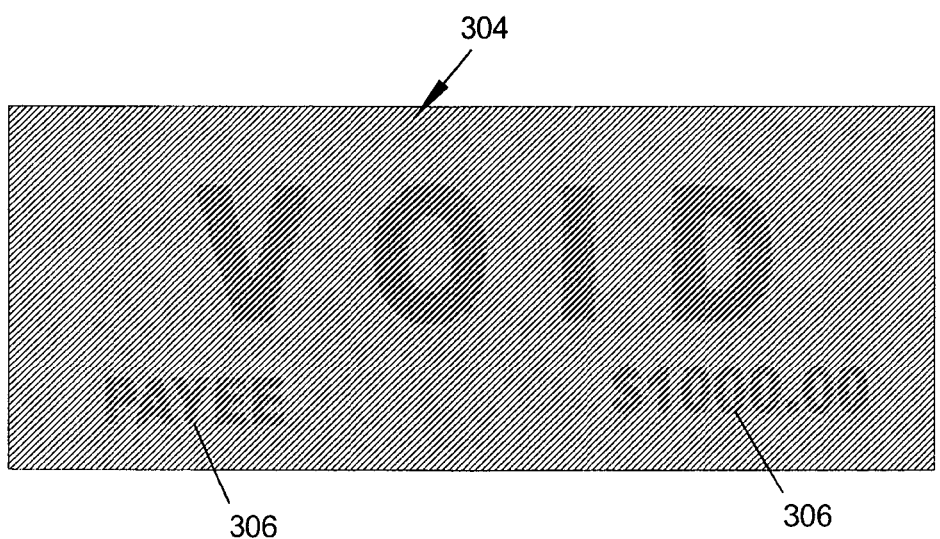
FIG. 14 presents a copy of the FIG. 13 document in accordance with the invention.

As is evident from FIG. 13, a pantograph is a pattern on an original that changes or becomes visible on a copy of the original. The pantograph may include static information such as "VOID", "COPY", "UNAUTHORIZED", etc., that remains the same from document to document. In addition, the pantograph may include variable information that varies from document-to-document during printing. Referring now to FIG. 14, variable information 306 is document specific, for example the payee and the original amount of a check. The original amount of an altered check is simply determined by making a copy of it. Often times, documents are printed for controlled distribution. By embedding variable data pantographs with control information such as name of document recipient, copied documents can be easily traced to the original. Variable data micro printing used in tandem with variable data pantographs can enhance document security.

The patterns of FIGS. 4-14 may be composed of one and two pixel objects or lines. The density of these objects or lines may be controlled relative to other pixels according to the principles of U.S. Provisional Application 60/526,466 entitled POST RIP IMAGE RENDERING FOR MICROPRINTING, filed on Dec. 3, 2003, naming Gregory G. Rombola, Thomas J. Foster, and John F. Crichton as inventors, the contents of which are incorporated by reference as if fully set forth herein. With a writer having grey-level functionality, the density of marking medium applied to an area on the receiver corresponding to a pixel may be controlled. For example, if eight bits per pixel are provided, 0 may correspond to no marking, and 255 may correspond to a maximum marking density. Any marking density within the range of 0-255 may be applied to the one pixel objects or lines, the two pixel objects or lines, or both. The density of the remaining pixels comprising a printed image may be maintained at another exposure level, 255 for example. In such manner, the legibility of microprinted alphanumeric characters or the printing of a pantograph may be optimized, generally through an iterative interactive process of making adjustments and printing the results. The density level may be changed interactively using an appropriate software interface, as shown FIG. 9 of the POST RIP IMAGE RENDERING IN AN ELECTROGRAPHIC PRINTER FOR MICROPRINTING patent application (in particular, the "One Pixel Wide" and "Two Pixel Wide" adjustments). With an electrographic imaging member, toning density is varied by varying exposure of the member.

Security of documents may be enhanced with microprinted lines incorporating information specific to the document, for example a negotiable instrument, such as payee's name and amount or encrypted cypher code. A check with a border, boxes, lines, etc. that are actually the payee and amount and/or other variable information associated with the document printed in microprinting would create a huge hurdle for a fraudster who wished to alter the check and have it go undetected.

In addition to being document specific, the microprinted line would be removed with the same difficulty as other information on the document. A digitally applied signature extending over the microprinted signature line would then be very difficult to remove without disturbing the line.

While use of MICR toner makes possible microprinting in addition to the MICR line itself in a single pass through the machine, nonMICR toner should work as well for the microprint line or box itself.

A digitally applied microprinted line of MICR toner can also be sensed magnetically. While it cannot be magnetically read as digits without being printed in an E13b or CMC-7 font, the fact that the material making up the line is magnetically active is easily shown with a standard magnetic check reader.

Digitally applied microprinting has the security characteristics of lithographically printed lines, i.e. not copyable, not overtly visible, easily read using low power magnification. In addition to those characteristics, microprinting using a Digimaster 9110m printer, manufactured by Heidelberg Digital L.L.C. of Rochester, N.Y., is digitally variable, similar in removal resistance to other elements, and applied in the same machine printing pass as the other variable data on the document.

Figure 15:
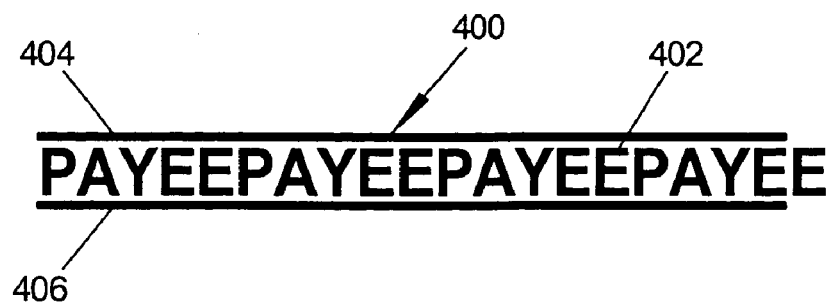
FIG. 15 presents an enlarged view of a microprinted line in accordance with the invention.

Referring now to FIG. 15, an enlarged view of a line 400 with microprint 402 is presented. The line 400 comprises opposing bounding lines 404 and 406 on either side of the microprint 402, and preferably immediately adjacent the microprint 402 without encroaching on it. Providing the bounding lines 404 and 406 renders a line that is more continuous to the unaided eye. The microprint 402 may comprise static or digitally variable information.

Figure 16:
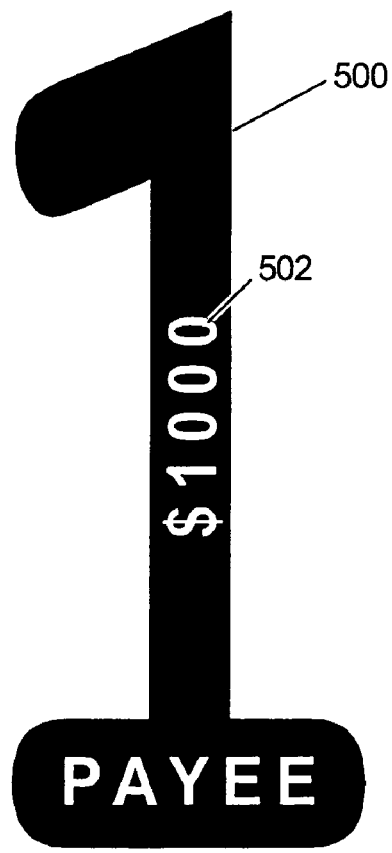
FIG. 16 presents an enlarged view of an character having reverse video microcharacter printing in accordance with the invention.

Referring now to FIG. 16, an enlarged view of a character 500 comprising reverse-video microprint 502 is presented according to an aspect of the invention. The character 500 may be of a size normally used to print documents. The reverse-video microprint may comprise static or digitally variable information. In the Example presented, the information comprises a payee and the amount of a check, although the invention is not so limited. The reverse video may be enhanced, and legibility improved, by altering edge pixels of the microprint, as described in the previously referenced application entitled "POST RIP IMAGE RENDERING FOR MICROPRINTING". For example, with a 0-15 bit grey-scale exposure writer, legibility may be enhanced by reducing exposure of the edge pixels to 7 bits. The MICR toner and development system disclosed herein provides enhanced edge development that improves legibility of the reverse-video characters. The reverse-video characters may be arranged in strings, as previously described herein.

EXAMPLE 1

The fonts presented in FIGS. 4, 5, and 6 were printed on a Digimaster 9110m printer, manufactured by Heidelberg Digital L.L.C., Rochester, N.Y., using a MICR toner as described in U.S. Pat. No. 6,610,451 entitled "DEVELOPMENT SYSTEMS FOR MAGNETIC TONERS HAVING REDUCED MAGNETIC LOADINGS", with about 23% iron oxide and 8% olefinic wax by weight, and a silica surface treatment. The Digimaster 9110m printer has a 600 dpi resolution and the photoconductive belt runs at about 17 inches per second. Post-RIP processing, as described herein, was not implemented. Photographs of the resulting prints, magnified, are presented in FIG. 17.

PARTS LIST

L length
P arrow
S receiver sheet
V voltage
10 printer machine
18 photoconductive belt
18a surface
20 motor
21a-21g roller
24 logic and control unit (LCU)
28 primary charging station
30 programmable voltage controller
32 writer interface
34 exposure station
34a writer
35 development station 35
35a backup roller 35a
36 image data source
37 raster image processor (RIP)
38 Marking Image Processor (MIP)
39 image render circuit
40 programmable controller
41 replenisher motor
42 toner auger
43 replenisher motor control
46 transfer station
46a programmable voltage controller
46b roller
48 cleaning station
49 fuser station
50 electrometer probe
52 backer bars
54 magnetic brush
56 mixture of hard magnetic carriers and toner
58 rotating shell
60 rotating plurality of magnets
62 electrically grounded
64 member velocity
66 shell surface velocity
76 densitometer
100 array
102 pixels
104 other pixels
106 areas
108 other areas
200 array
202 pixels
204 other pixels
300 document
302 pantograph
304 copy
306 variable information
400 line
402 microprint
404 bounding line
406 bounding line
500 character
502 reverse-video microprint

The invention claimed is:

1. A printing process, comprising:
defining an array comprising pixels identified for marking and other pixels adjacent to said pixels which are not identified for marking; and
printing a legible two point or less character on a receiver by at least partially marking areas on said receiver corresponding to said pixels and other areas on said receiver corresponding to said other pixels wherein the printing further comprises digitally varying said character.

2. The process of claim 1, said marking comprising marking with toner.

3. The process of claim 1, said marking comprising marking with accent color toner.

4. The process of claim 1, said marking comprising marking with clear toner.

5. The process of claim 1, said marking comprising markers with one or more process color toners.

6. The process of claim 1, said marking comprising marking with color toner other than black.

7. The process of claim 1, said marking comprising marking with toner that fluoresces when exposed to ultraviolet radiation.

8. The process of claim 1, said marking comprising marking with toner that fluoresces when exposed to infrared radiation.

9. A printing process, comprising:
printing a legible two point or less character on a receiver with MICR toner using an electrographic printer wherein the printing further comprises digitally varying said character.

10. A printing process, comprising:
printing a legible two point or less character on a receiver with toner using an electrographic printer wherein the printing further comprises digitally varying said character.

11. The process of claim 10, said printing comprising printing with accent color toner.

12. The process of claim 10, said printing comprising printing with clear toner.

13. The process of claim 10, said printing comprising printing with one or more process color toners.

14. The process of claim 10, said printing comprising printing with color toner other than black.

15. The process of claim 10, said printing comprising printing with toner that fluoresces when exposed to ultraviolet radiation.

16. The process of claim 10, said printing comprising printing with toner that fluoresces when exposed to infrared radiation.

17. A printing process, comprising:
printing a legible two point or less string of characters and opposing bounding lines on either side of said string of characters on a receiver using an electro graphic printer wherein the printing further comprises digitally varying said character.

18. The process of claim 17, comprising printing said legible two point or less string of characters and said opposing bounding lines on either side of said string of characters on said receiver with toner.

19. The process of claim 17, said printing comprising printing with accent color toner.

20. The process of claim 17, said printing comprising printing with one or more process color toners.

21. The process of claim 17, said printing comprising printing with MICR toner.

22. The process of claim 17, said printing comprising printing with clear toner.

23. The process of claim 17, said printing comprising printing with color toner other than black.

24. The process of claim 17, said printing comprising printing with toner that fluoresces when exposed to ultraviolet radiation.

25. The process of claim 17, said printing comprising printing with toner that fluoresces when exposed to infrared radiation.

* * * * *